(12) United States Patent
Yabusaki (10) Patent No.: US 11,205,429 B2
(45) Date of Patent: Dec. 21, 2021

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Ryoto Yabusaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 161 days.

(21) Appl. No.: 16/587,156

(22) Filed: Sep. 30, 2019

(65) Prior Publication Data
US 2020/0312320 A1 Oct. 1, 2020

(30) Foreign Application Priority Data

Apr. 1, 2019 (JP) .............................. JP2019-070196

(51) Int. Cl.
| | | |
|---|---|---|
| *G10L 15/22* | (2006.01) | |
| *G10L 15/26* | (2006.01) | |
| *G06F 3/14* | (2006.01) | |
| *G06F 3/16* | (2006.01) | |

(52) U.S. Cl.
CPC .............. *G10L 15/22* (2013.01); *G06F 3/14* (2013.01); *G06F 3/167* (2013.01); *G10L 2015/223* (2013.01)

(58) Field of Classification Search
CPC .................. G06F 3/167; G06F 3/0482; G06F 2203/0381; G10L 15/00
USPC ........................................ 704/231, 235, 246
See application file for complete search history.

(56) References Cited

U.S. PATENT DOCUMENTS 7,844,458 B2  11/2010  Hirota et al.
2007/0100636 A1*  5/2007  Hirota ................. G10L 15/1822
                                                     704/276

FOREIGN PATENT DOCUMENTS

| JP | 2005-4032 A | 1/2005 |
|---|---|---|
| JP | 2007-127813 A | 5/2007 |
| KR | 20100058318 | * 6/2010 |

* cited by examiner

*Primary Examiner* — George C Monikang
(74) *Attorney, Agent, or Firm* — Oliff PLC (57) ABSTRACT

An information processing apparatus includes a receiving part that receives processing information based on voice; and a controller that performs control so that the processing information indicated by the voice received by the receiving part is displayed on a display. The receiving part further receives modification of the processing information displayed on the display, and the controller further performs control so that the modification received by the receiving part is reflected in processing received by the receiving part.

16 Claims, 5 Drawing Sheets

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-070196 filed Apr. 1, 2019.

BACKGROUND

(i) Technical Field

The present disclosure relates to an information processing apparatus and a non-transitory computer readable medium.

(ii) Related Art

Recently, smart speakers have become widespread, and devices that support voice recognition are starting to be widely used accordingly. In particular, service that enables printing based on voice by using a multifunction printer that supports voice recognition is starting to be considered.

For example, Japanese Unexamined Patent Application Publication No. 2007-127813 discloses a voice recognition apparatus that enables setting based on voice. The voice recognition apparatus disclosed in Japanese Unexamined Patent Application Publication No. 2007-127813 includes a receiving part that receives a setting instruction given by voice, a voice interpretation unit that recognizes and interprets contents of the setting instruction given by the voice and generates first structured data including interpretation result candidates, an instruction entry detection unit that detects user's setting instruction entry, an instruction entry interpretation unit that interprets contents of the setting instruction entry and generates second structured data, and a selecting unit that selects one of the interpretation candidates included in the first structured data on the basis of the second structured data.

Japanese Unexamined Patent Application Publication No. 2005-4032 discloses a voice recognition apparatus that allows a user to select an item displayed on a screen of a display device by using voice. The voice recognition apparatus disclosed in Japanese Unexamined Patent Application Publication No. 2005-4032 includes an utterance target display unit that displays, on the screen, plural utterance targets associated with one item, a voice recognition unit that receives voice data corresponding to the voice and performs voice recognition, and a determining unit that determines that the item has been selected in a case where the voice data corresponds to any of the utterance targets as a result of the voice recognition.

SUMMARY

Conventionally, in a case where processing information received based on voice is incorrectly recognized, the processing information cannot be modified.

Aspects of non-limiting embodiments of the present disclosure relate to providing an information processing apparatus and a non-transitory computer readable medium that can modify processing information even in a case where processing information received based on voice is incorrectly recognized.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a receiving part that receives processing information based on voice; and a controller that performs control so that the processing information indicated by the voice received by the receiving part is displayed on a display, wherein the receiving part further receives modification of the processing information displayed on the display, and the controller further performs control so that the modification received by the receiving part is reflected in processing received by the receiving part.

BRIEF DESCRIPTION OF THE DRAWINGS

An exemplary embodiment of the present disclosure will be described in detail based on the following figures, wherein:

FIGS. 4A through 4C illustrate panel display of the information processing apparatus according to the present exemplary embodiment.

DETAILED DESCRIPTION

An exemplary embodiment is described below with reference to the drawings. Constituent elements and processes having identical functions are given identical reference signs throughout all of the drawings, and repeated description thereof is omitted.

First Exemplary Embodiment

Figure 1:
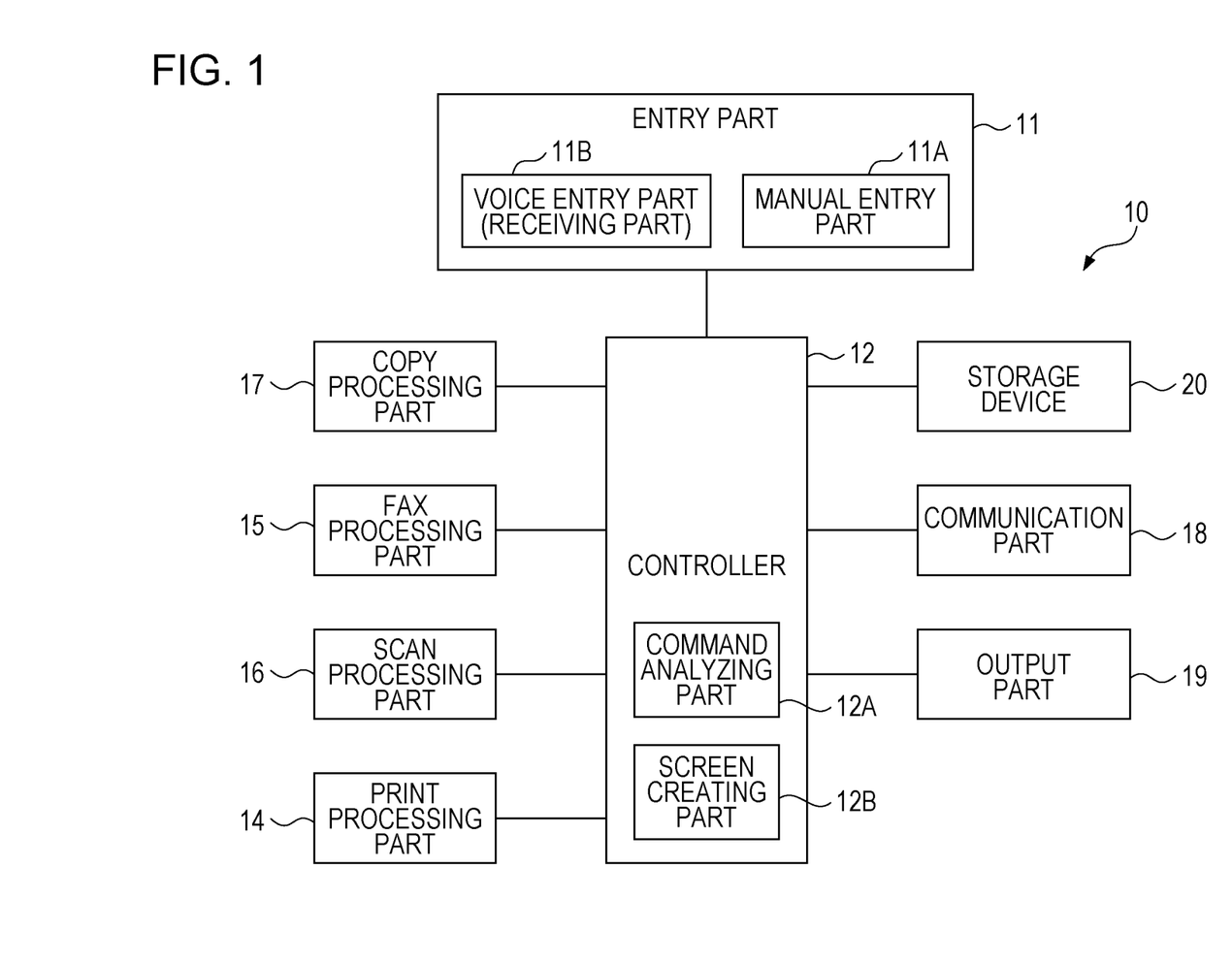
FIG. 1 illustrates an example of a functional configuration of an information processing apparatus according to the present exemplary embodiment.

FIG. 1 illustrates an example of a functional configuration of an information processing apparatus 10 according to the present exemplary embodiment. The information processing apparatus 10 is an electronic apparatus that has plural information processing functions concerning formation of an image or the like such as a print function, a facsimile function, a scan function, and a copy function and provides a function requested by an operator operating the information processing apparatus.

The information processing apparatus 10 may have a function different from the aforementioned functions provided that the function is an information processing function like the ones described above and may have, for example, an image processing function of performing image processing on an input image. The information processing apparatus 10 need not necessarily have plural functions described above and may have a single function.

As illustrated in FIG. 1, the information processing apparatus 10 includes functional parts, specifically, an entry part 11, a controller 12, a copy processing part 17, a print processing part 14, a facsimile (FAX) processing part 15, a scan processing part 16, a communication part 18, and an output part 19, and a storage device 20.

The entry part 11 receives an instruction from an operator and notifies the controller 12 about the instruction. Examples of the instruction from an operator include an instruction to start a function desired by the operator and an instruction to set a setting item that defines operation of the information processing apparatus 10.

The entry part 11 includes a voice entry part 11B serving as a receiving part that receives processing information based on voice and a manual entry part 11A that receives processing information based on manual entry.

The processing information includes both of a type of processing (i.e., service) such as copy processing, FAX processing, scan processing, or print processing and processing contents (i.e., a service option) such as "A2, 2 copies".

The controller 12 controls other functional parts and the storage device 20 included in the information processing apparatus 10 so that processing based on the operator's instruction received by the entry part 11 is performed.

In a case where a FAX destination or the like is received by the entry part 11, the entered destination or the like is registered in the storage device 20 under control of the controller 12.

The print processing part 14 is a functional part that executes a print function of forming contents of data on a recording medium such as a sheet of paper under control of the controller 12, for example, upon receipt of the data together with a print instruction.

The FAX processing part 15 is a functional part that executes a facsimile function of transmitting and receiving data through a FAX line (not illustrated) under control of the controller 12, for example, upon receipt of the data together with a FAX instruction.

The scan processing part 16 is a functional part that executes a scan function of optically reading contents written on a document and generating data of the document under control of the controller 12, for example, upon receipt of an instruction to read an image.

The copy processing part 17 is a functional part that executes a copy function of forming data of a document read by the scan processing part 16 on a recording medium as an image and generating a copy of the read document in cooperation with the print processing part 14 and the scan processing part 16 under control of the controller 12, for example, upon receipt of a function to copy the document.

The communication part 18 transmits and receives various kinds of information to and from apparatuses connected to a communication line (not illustrated) such as a FAX line, a telephone line, or the Internet under control of the controller 12. For example, the communication part 18 transmits data generated by the scan processing part 16 to a designated e-mail address or SNS account through the communication line. Furthermore, the communication part 18 transmits data received from the FAX processing part 15 through the controller 12 to a designated FAX number through the FAX line and, in a case where data is received through the FAX line, notifies the controller 12 so that the data is processed by the FAX processing part 15. Furthermore, in a case where data is received through the communication line, the communication part 18 notifies the controller 12 so that contents of the data are formed on a recording medium by the print processing part 14.

Note that a destination of data is designated, for example, by user's selection from among data registered in the storage device 20.

The output part 19 outputs, on a display unit 38C (see FIG. 2) serving as a display, a processing situation in the information processing apparatus 10 and various kinds of screens for receiving various kinds of instructions from the operator by using the entry part 11 under control of the controller 12.

Figure 2:
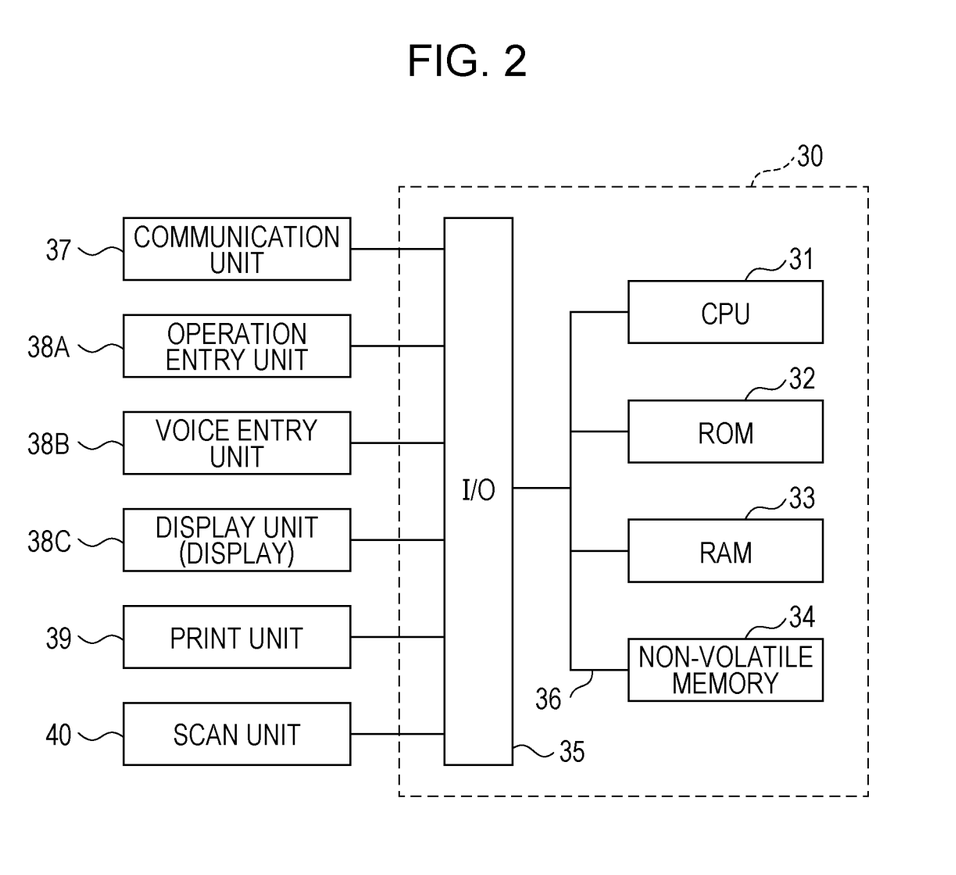
FIG. 2 illustrates an example of a configuration of a substantial part of an electric system of the information processing apparatus according to the present exemplary embodiment.

The information processing apparatus 10 illustrated in FIG. 1 is constituted, for example, by a computer 30 (see FIG. 2).

FIG. 2 illustrates an example of a configuration of a substantial part of an electric system of the information processing apparatus 10 using the computer 30.

The computer 30 includes a central processing unit (CPU) 31 that serves as the functional parts of the information processing apparatus 10, a read only memory (ROM) 32 in which an information processing program for causing the computer 30 to function as the functional parts of the information processing apparatus 10 is stored, a random access memory (RAM) 33 used as a temporary working area of the CPU 31, a non-volatile memory 34, and an input output interface (I/O) 35. The CPU 31, the ROM 32, the RAM 33, the non-volatile memory 34, and the I/O 35 are connected through a bus 36.

The non-volatile memory 34 is an example of a storage device in which stored information is maintained even when power supplied to the non-volatile memory 34 is cut off. The non-volatile memory 34 is, for example, a semiconductor memory but may be a hard disk. The non-volatile memory 34 need not necessarily be provided in the computer 30 and may be, for example, a storage device, such as a memory card, detachably attached to the computer 30.

To the I/O 35, for example, a communication unit 37, an operation entry unit 38A, a voice entry unit 38B, a display unit 38C serving as a display, a print unit 39, and a scan unit 40 are connected.

The communication unit 37 is connected to the communication line and includes a communication protocol that performs data communication with apparatuses connected to the communication line. Examples of the communication protocol included in the communication unit 37 include a communication protocol compliant with a G3 standard that defines FAX communication, and therefore the communication unit 37 also supports FAX communication.

The operation entry unit 38A, the voice entry unit 38B, and the display unit 38C are unit that provides an interface with the information processing apparatus 10 to the operator and are, for example, attached to a housing of the information processing apparatus 10.

The operation entry unit 38A is an entry device that receives an instruction from an operator and notifies the CPU 31 about the instruction and is, for example, a button, a touch panel, and the like. The information processing apparatus 10 receives an instruction manually entered by the operator through the operation entry unit 38A.

The voice entry unit 38B receives an operator's instruction based on voice. In this case, a microphone is used as the voice entry unit 38B.

In the present exemplary embodiment, a microphone is used as the voice entry part 11B serving as a receiving part, but the present exemplary embodiment is not limited to this. Instead of this or in addition to this, the receiving part may be configured such that operator's voice is received by a microphone provided in a smart speaker and the operator's voice is supplied as a command to the information processing apparatus by combining, for example, a smart remote control using an infrared ray with the speaker and the information processing apparatus.

Furthermore, a function similar to a smart speaker may be incorporated into the information processing apparatus instead of providing a smart speaker outside the information processing apparatus.

The display unit 38C is a display and is a device that displays information processed by the CPU 31 and is, for example, a liquid crystal display, an organic electro luminescence (EL) display, or the like.

The print unit 39 is a unit that forms an image on a recording medium in accordance with an instruction of the CPU 31. An image formation system employed in the print unit 39 is not limited and may be an electrophotographic system or may be an inkjet system. The print unit 39 is used for execution of a print function, a copy function, and a FAX function.

The scan unit 40 is a unit that optically reads contents of a document placed, for example, on platen glass (not illustrated) and converts the contents of the document into data in accordance with an instruction of the CPU 31. The scan unit 40 is used for execution of a scan function.

The copy function is realized in a manner such that the CPU 31 causes the print unit 39 to form image data obtained by the scan unit 40 on a recording medium.

In the present exemplary embodiment, the voice entry part 11B serving as a receiving part that receives processing information based on voice and the controller 12 that performs control so that the processing information indicated by the voice received by the receiving part is displayed on the display unit 38C serving as a display are provided.

The voice entry part 11B serving as a receiving part is configured to further receive modification of the processing information displayed on the display unit 38C serving as a display, and the controller 12 is configured to further perform control so that the modification received by the voice entry part 11B serving as a receiving part is reflected in processing received by the receiving part.

According to the present exemplary embodiment, it is possible to provide the information processing apparatus 10 and an information processing program that will be described later that can modify processing information even in a case where the processing information received based on voice is incorrectly recognized.

Figure 4A:
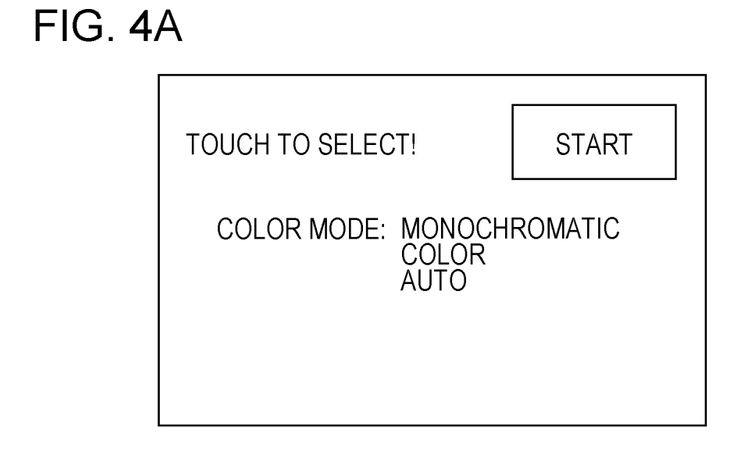
FIG. 4A is an explanatory view illustrating a specific example of an operation of selecting a color mode.
Figure 4B:
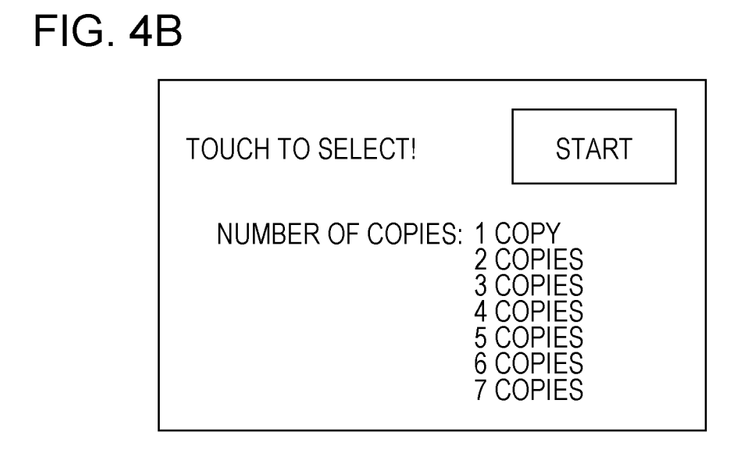
FIG. 4B is an explanatory view illustrating a specific example of selection of the number of copies.
Figure 4C:
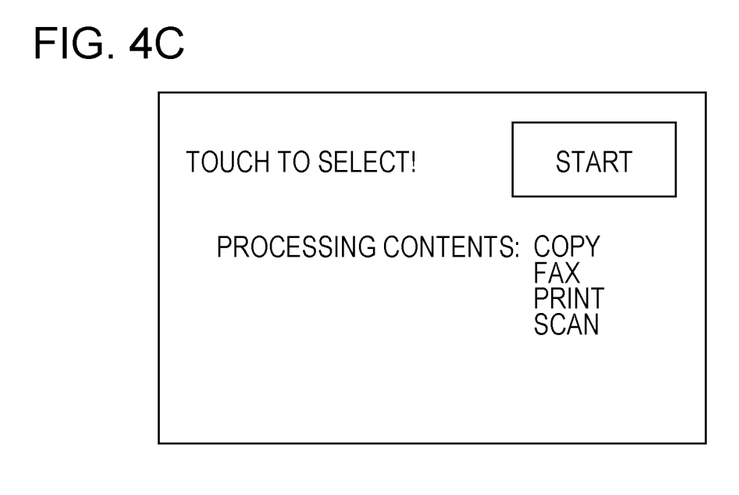
FIG. 4C is an explanatory view illustrating selection of processing contents.

This modification is made by displaying plural candidates registered in advance on the display (the display unit 38C) in accordance with an operation for selecting the processing information and causing an operator to select modified processing information from among the plural candidates (see FIGS. 4A through 4C).

According to the present exemplary embodiment, a modification instruction can be entered by selecting modified processing information from among plural candidates.

As illustrated in FIGS. 4A through 4C that will be described later, an order in which these candidates are displayed is a descending order of possibility of being selected. The "descending order of possibility of being selected" is stored in advance as data in the storage device. This order is updated to a latest order in consideration of a result of counting of a use frequency and the like by the controller 12 as the information processing apparatus is used.

According to the present exemplary embodiment, candidates are displayed in the descending order of possibility of being selected, and therefore a desired candidate can be selected from among plural candidates as compared with a case where the candidates are not displayed in the descending order of possibility of being selected.

The "descending order of possibility of being selected" is a descending order of use frequency as illustrated in FIG. 4B.

Specifically, for example, in a case where "Make one copy (ichibu)!", which is similar to "seven copies (hichibu)" in pronunciation, is uttered, "one copy (ichibu)" whose use frequency is higher is placed at a top of a pulldown menu.

According to the present exemplary embodiment, candidates are displayed in the descending order of use frequency, and therefore a desired candidate can be selected from among plural candidates as compared with a case where the candidates are not displayed in the descending order of use frequency.

The controller 12 is configured to further perform control so that processing is executed in accordance with the processing information after elapse of a predetermined period from the control for displaying the processing information on the display unit 38C serving as a display.

Specifically, the controller 12 is configured to start processing contents, for example, copy processing, for example, in a case where no operation is made by using the manual entry part 11A for a predetermined period (time) and there is no voice entry from the voice entry part 11B serving as a receiving part.

According to the present exemplary embodiment, control is further performed so that processing is executed in accordance with the processing information after elapse of the predetermined period from the control for displaying the processing information on the display unit 38C serving as a display. This makes it unnecessary to, for example, give an instruction to execute the processing each time.

The voice entry part 11B serving as a receiving part is configured to be capable of further receiving the predetermined period.

According to the present exemplary embodiment, the voice entry part 11B serving as a receiving part further receives the predetermined period itself, and therefore a time of execution of the processing in accordance with the processing information can be adjusted.

The voice entry part 11B serving as a receiving part is configured to further receive entry of an instruction to start execution of the processing indicated by the processing information, and the controller 12 is configured to further perform control so that the processing is not executed in a case where entry of the instruction is not received by the voice entry part 11B serving as a receiving part.

According to the present exemplary embodiment, processing is not executed unless entry of an instruction to start execution of the processing indicated by the processing information is received. It is therefore possible to prevent execution of processing based on incorrect processing information.

The instruction to start execution can be entered by voice by using the voice entry part 11B serving as a receiving part.

According to the present exemplary embodiment, the instruction to start execution can be entered by voice.

The controller 12 is configured to perform control so that the processing information is not displayed on the display unit 38C serving as a display in a case where a predetermined condition is not met. Since the processing information indicated by the voice received by the receiving part is not displayed on the display in a case where the predetermined condition is not met, modification of the processing information displayed on the display can be further received only in a case where the predetermined condition is met.

The predetermined condition is a condition that the processing indicated by the processing information is processing whose degree of influence caused in a case where the processing is erroneously executed is a predetermined degree.

That is, modification is allowed in a case where the processing indicated by the processing information is processing whose degree of influence caused in a case where the processing is erroneously executed is the predetermined degree.

The processing whose degree of influence is the predetermined degree is processing whose fee generated as a result of execution is a predetermined amount.

That is, modification is allowed in a case where the processing indicated by the processing information is processing whose fee generated as a result of erroneous execution of the processing is the predetermined amount.

Specifically, for example, the "predetermined condition" is a condition that a price per copy is 10 yen or more. In this case, for example, in a case of color copy whose price per copy is 20 yen, which is more than 10 yen, processing contents (color copy, 3 copies) are displayed on the display unit 38C serving as a display, whereas in a case of monochromatic copy whose price per copy is, for example, 8 yen, which is less than 10 yen, processing contents (monochromatic copy, 3 copies) are not displayed on the display unit 38C serving as a display.

Alternatively, control may be performed so that processing contents are displayed in a case of charged service (e.g., copy processing), whereas processing contents are not displayed in a case of a non-charged service (e.g., scan).

Other examples of the processing whose "degree of influence is a predetermined degree" include system setting change.

This is because it is sometimes inconvenient in a case where the system setting change, which is a function having a high risk when the function is executed without displaying on the display unit 38C serving as a display based on voice, i.e., without checking, is performed.

A manner in which the processing information displayed on the display unit 38C serving as a display is displayed is different from normal display for manual entry of an instruction to execute processing indicated by corresponding processing information.

According to the present exemplary embodiment, since a manner in which the processing information displayed on the display is displayed is different from display for manual entry of an instruction to execute processing indicated by corresponding processing information, a case where the processing information is entered by voice and a case where the processing information is entered manually can be distinguished.

Specifically, for example, a manner of displaying of the processing information on the display and a normal manner of displaying are different only in one or more of buttons.

According to the present exemplary embodiment, a manner of displaying of the processing information on the display and a manner of displaying for manual entry of an instruction to execute processing indicated by corresponding processing information are different only in one or more of buttons, these manners of displaying can be distinguished without need for a large change.

The difference is not limited to a difference in one or more of buttons and may be a difference in all buttons.

Figure 3:
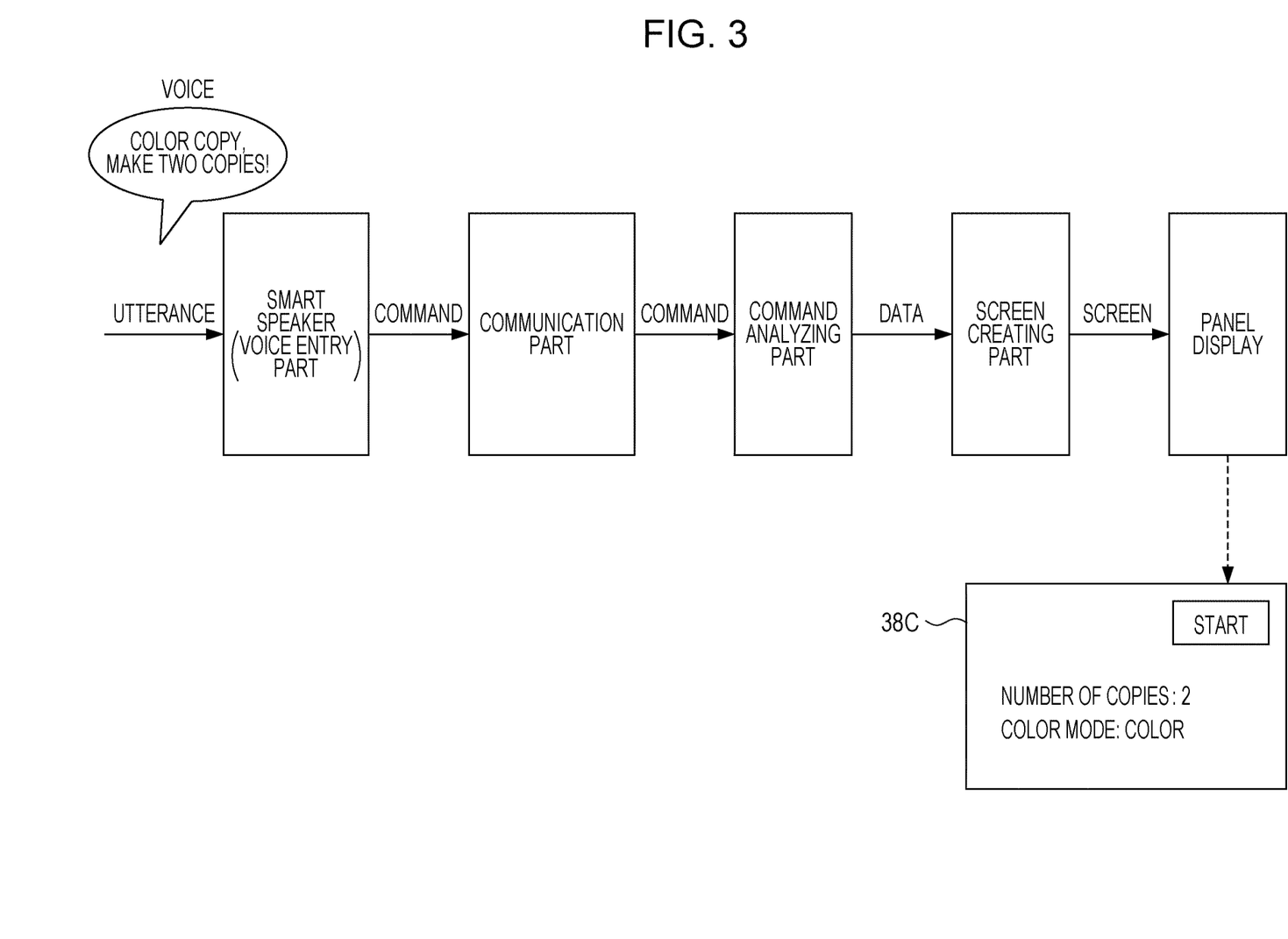
FIG. 3 is an explanatory view illustrating an example of flow of processing of the information processing apparatus according to the present exemplary embodiment.

FIG. 3 is an explanatory view illustrating an example of flow of processing of the information processing apparatus 10 according to the present exemplary embodiment.

First, an operator places paper for copying to use a processing type "copy function" and utters "Color copy, make 2 copies!". The voice entry part 11B or a smart speaker receives the voice, the command is supplied to a command analyzing part 12A through the communication part 18, and contents of the voice are analyzed.

Specifically, the voice is converted into a text command. Specifically, in the above case, the voice is converted into a text command including "color", "copy", and "2 copies".

The command analyzing part 12A uses this text command as processing contents (service options) and sets a color mode to "color", sets the number of copies to "2 copies", and sets "copy" as a processing type (service).

Then, a screen creating part 12B generates a screen including "color mode: color" and "the number of copies: 2 copies" as a screen for the processing contents (service options) and generates an execution screen for "copy" as the processing type (service).

Then, the contents of the screen are displayed on a panel that is a liquid crystal display device as illustrated in FIG. 3.

As illustrated in FIG. 3, only the processing contents (service options) designated by the voice are displayed on a display screen of the display unit 38C serving as a display.

The screen illustrated in FIG. 3 is a screen different from a normal screen displayed when a copy operation is selected not by voice entry and is a screen displayed only by voice entry.

When the operator taps (touches) a position of the liquid crystal screen close to "2" of the number of copies "2" on the screen illustrated in FIG. 3, a numerical keypad is displayed so that "2" can be changed to any value.

Values of the number of copies may be displayed in a descending order of use frequency as illustrated in FIG. 4B that will be described later.

Furthermore, when the operator utters, for example, "Set resolution to 300 dpi!", "resolution 300 dpi" is displayed on the screen of the display. Then, when the operator taps a position close to "300 dpi", other plural values of resolution are displayed so as to be selectable.

Furthermore, when the operator taps "color" of the color mode of FIG. 3, a pop-up screen on which "monochromatic", "color", and "auto" are selectable is displayed so that "color" can be changed to any setting.

FIGS. 4A and 4B illustrate an example of an operation for selecting processing contents (service options), and FIG. 4C illustrates an example of an operation for selecting a processing type (service).

Figure 5:
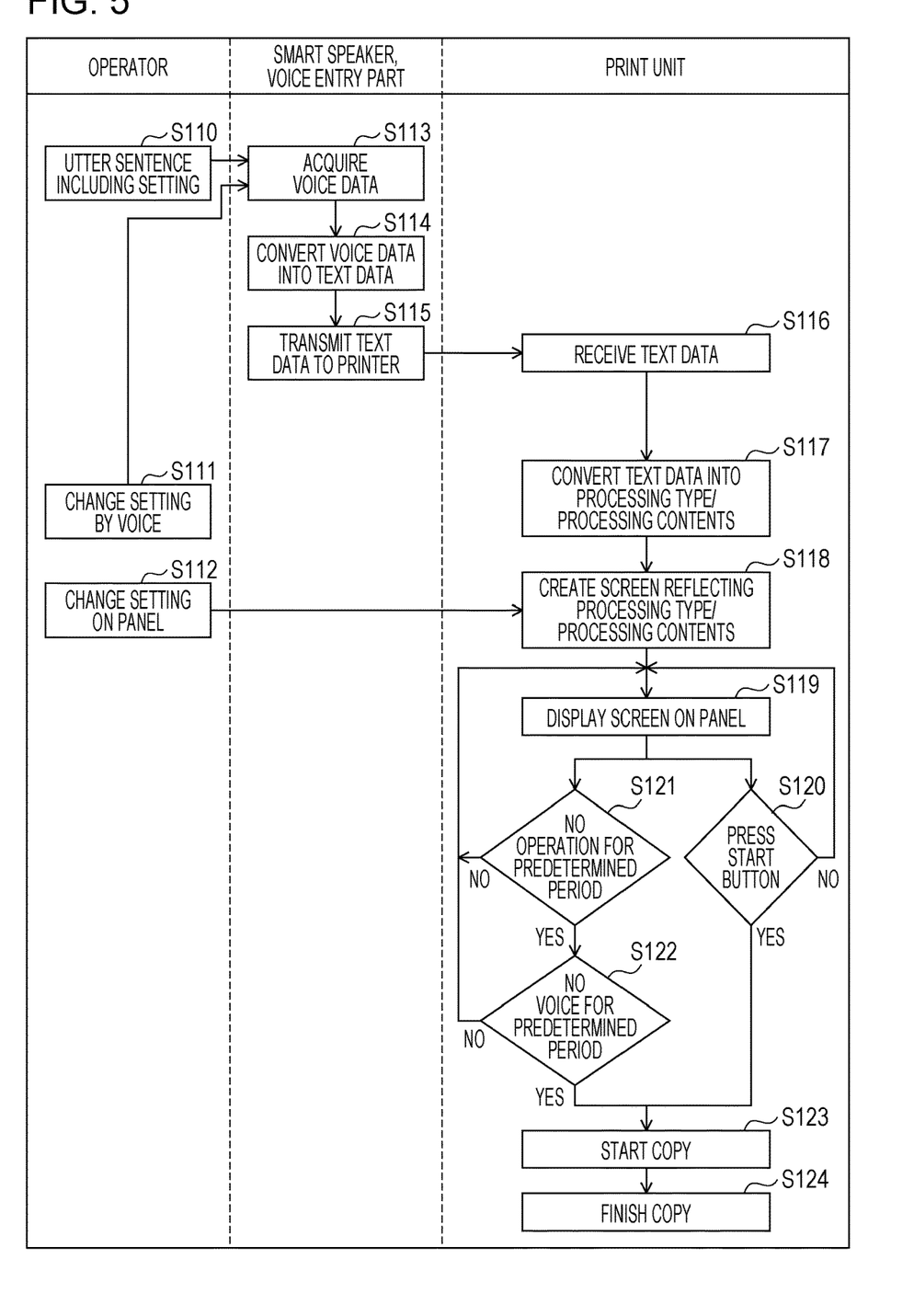
FIG. 5 is a flowchart for explaining flow of processing of the information processing apparatus according to the present exemplary embodiment from viewpoints of an operator, a voice entry part (smart speaker), and a print unit.

FIG. 5 is a flowchart for explaining flow of processing of the information processing apparatus according to the exemplary embodiment from viewpoints of an operator, a voice entry part (or a smart speaker), and a print unit.

First, in step 110, the operator utters a sentence including setting. Then, the processing proceeds to next step 113.

In step 113, the voice entry part 11B (or the smart speaker) acquires the voice data. Then, the processing proceeds to next step 114.

In step 111, the setting is changed by voice in a case where the setting is changed by voice. Then, the processing proceeds to step 113.

In step 112, the setting is changed on the panel in a case where the setting is changed manually on the panel. Then, the processing proceeds to step 118.

In step 114, the voice data is converted into text data. Then, the processing proceeds to next step 115.

In step 115, the text data is transmitted to the print unit 39. Then, the processing proceeds to step 116 of the print unit 39.

In step 116, the text data is received from the voice entry part 11B (or the smart speaker). Then, the processing proceeds to next step 117.

In step 117, the text data is converted into a processing type or processing contents. Then, the processing proceeds to next step 118.

In step 118, a screen reflecting the processing type or processing contents is created. Then, the processing proceeds to next step 119.

In step 119, the screen is displayed on the panel. Then, the processing proceeds to next step 121 or step 120.

In step 121, it is determined whether or not there is no operation for a predetermined period. In a case where it is determined that there is no operation for the predetermined period, the processing proceeds to next step 122. In a case where it is determined that there is an operation within the predetermined period, the processing returns to step 119.

In step 122, it is determined whether or not there is no receipt of voice for a predetermined period. In a case where it is determined that there is no receipt of voice, the processing proceeds to next step 123. In a case where it is determined that there is receipt of voice within the predetermined period, the processing returns to step 119.

In step 120, it is determined whether or not an operation of pressing a start button has been performed. In a case where it is determined that the pressing operation has been performed, the processing proceeds to next step 123. In a case where it is determined that no pressing operation has been performed, the processing returns to step 119.

In step 123, copy is started. Then, the processing proceeds to next step 124.

In step 124, copy is finished. Then, the processing is finished.

Although the present disclosure has been described by using the exemplary embodiment, the present disclosure is not limited to the scope described in the exemplary embodiment. The exemplary embodiment can be changed or modified in various ways without departing from the spirit of the present disclosure, and the change or modification is also encompassed within the technical scope of the present disclosure. For example, the order of processes may be changed without departing from the spirit of the present disclosure.

Although an aspect in which the processes realized by software has been described as an example in the present exemplary embodiment, processes equivalent to the processes in the flowchart may be implemented, for example, in an application specific integrated circuit (ASIC) and be processed by hardware. In this case, processing speed can be increased as compared with a case where the processes are realized by software.

Although an aspect in which the information processing program is installed in a ROM has been described in the above exemplary embodiment, the exemplary embodiment is not limited to this. The information processing program according to the present disclosure can be provided by being recorded on a computer-readable recording medium. For example, the information processing program according to the present disclosure may be provided by being recorded on an optical disk such as a compact-disc (CD)-ROM or a digital versatile disc (DVD)-ROM. Furthermore, the information processing program according to the present disclosure may be provided by being recorded on a semiconductor memory such as a universal serial bus (USB) memory or a flash memory. Furthermore, an information processing apparatus such as the information processing apparatus 10 or an information apparatus 50 may acquire a program from an external device connected to a communication line through the communication line.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a receiving part that receives processing information based on voice; and
   a controller that performs control so that the processing information indicated by the voice received by the receiving part is displayed on a display, wherein:
   the receiving part further receives modification of the processing information displayed on the display,
   the controller performs control so that the modification received by the receiving part is reflected in processing received by the receiving part,
   the controller performs control so that the processing information is not displayed on the display in a case where a predetermined condition is not met, and
   the predetermined condition is a condition that the processing indicated by the processing information is processing whose degree of influence caused in a case where the processing is erroneously executed is a predetermined degree.

2. The information processing apparatus according to claim 1, wherein
   the modification is made by displaying a plurality of candidates registered in advance on the display in accordance with an operation of selecting the processing information and selecting modified processing information from among the candidates.

3. The information processing apparatus according to claim 2, wherein
   an order in which the candidates are displayed is a descending order of possibility of being selected.

4. The information processing apparatus according to claim 3, wherein
   the descending order of possibility of being selected is a descending order of use frequency.

5. The information processing apparatus according to claim 1, wherein the controller further performs control so that the processing is executed in accordance with the processing information after elapse of a predetermined period from the control for displaying the processing information on the display.

6. The information processing apparatus according to claim 2, wherein
the controller further performs control so that the processing is executed in accordance with the processing information after elapse of a predetermined period from the control for displaying the processing information on the display.

7. The information processing apparatus according to claim 3, wherein
the controller further performs control so that the processing is executed in accordance with the processing information after elapse of a predetermined period from the control for displaying the processing information on the display.

8. The information processing apparatus according to claim 4, wherein
the controller further performs control so that the processing is executed in accordance with the processing information after elapse of a predetermined period from the control for displaying the processing information on the display.

9. The information processing apparatus according to claim 5, wherein
the receiving part further receives the predetermined period.

10. The information processing apparatus according to claim 1, wherein
the receiving part further receives entry of an instruction to start execution of the processing indicated by the processing information; and
the controller further performs control so that the processing is not executed in a case where entry of the instruction is not received by the receiving part.

11. The information processing apparatus according to claim 10, wherein
the entry of the instruction to start the execution is voice entry.

12. The information processing apparatus according to claim 1, wherein
the processing whose degree of influence is the predetermined degree is processing whose fee generated as a result of execution is a predetermined amount.

13. The information processing apparatus according to claim 1, wherein
the processing information displayed on the display is displayed in a manner different from normal display for manual entry of an instruction to execute processing indicated by the corresponding processing information.

14. The information processing apparatus according to claim 13, wherein
the manner in which the processing information displayed on the display is displayed, and the normal display are different only in one or more buttons.

15. A non-transitory computer readable medium storing a program causing a computer to execute a process for information processing, the process comprising:
receiving processing information based on voice; and
performing control so that the processing information indicated by the received voice is displayed on a display, wherein:
modification of the processing information displayed on the display is further received,
control is performed so that the received modification is reflected in received processing,
control is performed so that the processing information is not displayed on the display in a case where a predetermined condition is not met, and
the predetermined condition is a condition that the processing indicated by the processing information is processing whose degree of influence caused in a case where the processing is erroneously executed is a predetermined degree.

16. An information processing apparatus comprising:
receiving means for receiving processing information based on voice; and
controlling means for performing control so that the processing information indicated by the voice received by the receiving means is displayed on a display, wherein:
the receiving means further receives modification of the processing information displayed on the display,
the controlling means performs control so that the modification received by the receiving means is reflected in processing received by the receiving means,
the controlling means performs control so that the processing information is not displayed on the display in a case where a predetermined condition is not met, and
the predetermined condition is a condition that the processing indicated by the processing information is processing whose degree of influence caused in a case where the processing is erroneously executed is a predetermined degree.

* * * * *